United States Patent [19]
Kamienski et al.

[11] 3,817,955
[45] June 18, 1974

[54] PREPARATION OF POLYMERS USING COMPLEXES OF ORGANOMAGNESIUMS WITH CERTAIN HYDRIDES AS CATALYSTS

[75] Inventors: Conrad W. Kamienski; Joseph H. Merkley, both of Gastonia, N.C.

[73] Assignee: Gulf Resources & Chemical Corporation, Houston, Tex.

[22] Filed: Nov. 10, 1971

[21] Appl. No.: 197,540

Related U.S. Application Data

[62] Division of Ser. No. 66,563, Aug. 24, 1970, Pat. No. 3,691,241.

[52] U.S. Cl. ......... 260/83.7, 260/93.7, 260/94.2 M, 260/94.9 R
[51] Int. Cl. ........................ C08d 1/32, C08f 19/08
[58] Field of Search ..... 260/665 G, 94.2 R, 94.2 M, 260/83.7

[56] References Cited
UNITED STATES PATENTS

| | | | |
|---|---|---|---|
| 3,509,067 | 4/1970 | Bostick | 260/94.2 R |
| 3,526,604 | 9/1970 | Wadsworth | 260/94.2 |
| 3,646,231 | 2/1972 | Kamienski | 260/94.2 M |
| 3,655,790 | 4/1972 | Ashby | 260/665 G |
| 3,691,241 | 9/1972 | Kamienski et al. | 260/94.2 M |

*Primary Examiner*—James A. Seidleck
*Attorney, Agent, or Firm*—Wallenstein, Spangenberg, Hattis & Strampel

[57] ABSTRACT

Preparation of polymers of conjugated dienes, such as those of 1,3-butadiene; utilizing, as a catalyst, complexes or organomagnesiums with (i) alkali metal hydrides or (ii) tetraalkylammonium hydrides, as, for example, complexes of di-sec-butyl-magnesiums with potassium hydride or tetramethylammonium chloride.

11 Claims, No Drawings

PREPARATION OF POLYMERS USING COMPLEXES OF ORGANOMAGNESIUMS WITH CERTAIN HYDRIDES AS CATALYSTS

This application is a division of application Ser. No. 66,563, filed Aug. 24, 1970, now U.S. Pat. No. 3,691,241.

This invention relates to the production of polymers of conjugated dienes in which there is utilized, as a catalyst, complexes of organomagnesiums with alkali metal hydrides or with tetraalkylammonium hydrides.

The complexes utilized in the practice of the present invention are disclosed in the application of Eugene C. Ashby, Ser. No. 9,998, filed Feb. 9, 1970, now U.S. Pat. No. 3,655,790. As there disclosed, various said complexes can be represented by the formula $M_nMgR^1R^2H_n$ where M is sodium, potassium, lithium or cesium, $R^1$ and $R^2$ are the same or different $C_2$–$C_{15}$ alkyl (1°, 2° or 3°), carbocyclic aryl or carbocyclic aralkyl, or cycloalkyl; and n is ½, 1, 2 or 3, illustrative examples of said complexes being the following, where M is as indicated above, particularly sodium or potassium.

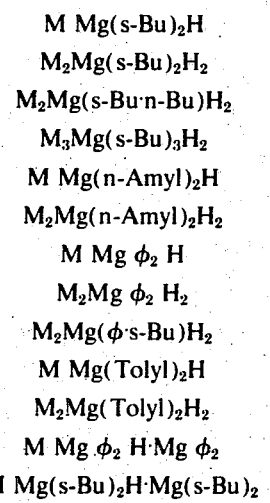

Formulae representing the complexes used in the practice of the present invention can be written in a number of different ways. Thus, for instance, in the case of the complex $KMg\ \phi_2\ H\cdot Mg\ \phi_2$, the same complex also can be expressed by either of the following formulae: $(KH)_{1/2}Mg\ \phi_2$ and $KH\cdot(Mg\ \phi_2)_2$.

Among said organomagnesiums which can be utilized to form the complexes employed in the practice of the present invention are di-n-propylmagnesium, diisopropylmagnesium, isopropyl-isobutyl magnesium, di-n-butylmagnesium, di-s-butylmagnesium, s-butyl-n-amyl magnesium, di-n-amylmagnesium, diisoamylmagnesium, dihexylmagnesiums, diheptylmagnesiums, dioctylmagnesiums, dinonylmagnesiums, s-butylisooctyl magnesium, didecylmagnesiums, didodecylmagnesiums, ditridecylmagnesiums, ditetradecylmagnesium, dipentadecylmagnesium, dicyclohexylmagnesium, dicyclooctylmagnesium, diphenylmagnesium, di-p-tolylmagnesium, di-p-anisylmagnesium, dibenzylmagnesiums and dixylylmagnesiums. While, as indicated, in the case of the complexes of the dialkylmagnesiums, the alkyl radicals may contain as low as 2 carbon atoms, the use of such complexes is far less desirable than the use of those in which the alkyl radicals contain at least 4 carbon atoms. Accordingly, in producing the conjugated diene polymers pursuant to the present invention, it is especially advantageous to use complexes of the dialkylmagnesiums with the alkali metal hydrides in which each of the alkyl radicals contains from 4 to 15 carbon atoms, and especially useful are those in which the alkyl radicals contain from 4 to 5 carbon atoms, notably those in which the dialkylmagnesium is di-s-butylmagnesium.

Of the alkali metal hydrides with which the organomagnesiums are reacted to produce the complexes used pursuant to the present invention, sodium hydride and potassium hydride are especially useful. However, lithium hydride and cesium hydride can also be employed. The complexes which are made from lithium hydride, generally speaking, are not as stable as those of said other alkali metals. Furthermore, as pointed out above, the complexes can also be utilized in the form of their tetraalkylammonium derivatives, that is, where the alkali metal of the alkali metal hydride present in the complex is replaced by tetraalkylammonium. Thus, for instance, the complex $KMg(s-Bu)_2H$ dissolved in a liquid hydrocarbon such as cyclohexane, benzene or toluene is admixed with an equivalent amount of a tetraalkylammonium halide, such as tetramethylammonium chloride, tetraethylammonium chloride, dodecyltrimethylammonium chloride, or the corresponding bromides. Potassium chloride or potassium bromide, as the case may be, precipitates out, leaving, in solution, the complex in which tetraalkylammonium has replaced the potassium. Said complexes are useful for the production of conjugated diene polymers in accordance with the present invention.

The complexes are desirably prepared by reacting the organomagnesium with the alkali metal hydride in an inert liquid medium, particularly a liquid hydrocarbon, at a temperature in the range of about 0° C to 150° C, preferably, in most cases, in the range of about 25° C to 100° C.

The reaction media in which the aforesaid complexes are most desirably prepared are liquid hydrocarbons, which may be of aliphatic, cycloaliphatic or aromatic character, illustrative examples of which are n-pentane, n-hexane, n-heptane, octane, cyclohexane, cyclooctane, benzene, toluene, ethylbenzene, xylenes, and mixtures of any two or more thereof. Non-aromatic tertiary monoamines and tertiary polyamines can also be used, illustrative examples of which are triethylamine, triisopropylamine, triisobutylamine, N-methylpiperidine, N,N'-dimethylpiperazine, N,N'-tetramethylethylenediamine and triethylenediamine. Generally speaking, ethers should be avoided since, as has been pointed out above, they cause cleavage of the complexes and, thus, they do not permit the formation and isolation or recovery of the complexes. However, in isolated instances, ethers can be used, as in the production of a complex of diphenylmagnesium with potassium hydride in a diethyl ether reaction medium at room temperature.

As disclosed in the aforementioned patent application of Eugene C. Ashby, illustrative examples of the preparation of the complexes are as follows:

EXAMPLE 1

Di-s-butylmagnesium (s-Bu$_2$Mg) is stirred with an equivalent amount of potassium hydride in a cyclohexane reaction medium, at a temperature of 30° C for several hours until the potassium hydride dissolves. Analysis of the solution shows a K:Mg:H ratio of 1.01:1.00:1.02.) Removal of the solvent under vacuo results in leaving a light yellow oil (comprising a complex corresponding to the formula $KMg(s\text{-}Bu)_2H$).

It has been observed that, when either excess potassium hydride is stirred with $KMg(s\text{-}Bu)_2H$, or when 2 equivalents of potassium hydride are stirred with 1 equivalent of di-s-butylmagnesium, precipitation of the magnesium-containing species occurs.

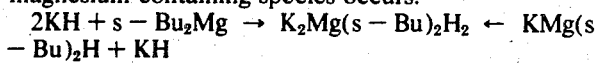

Thus, it appears that the soluble complex is a 1:1 adduct. The 2:1 complex is isolated as a light green powder which darkens if exposed in a dry box for extended periods of time. This powder is highly flammable in air.

EXAMPLE 2

2 equivalents of $s\text{-}Bu_2Mg$ and 1 equivalent of sodium hydride are reacted in cyclohexane at a temperature of 40° C for about 2 days to produce a complex corresponding to the formula $NaMg(s\text{-}Bu)_2H\cdot s\text{-}Bu_2Mg$.

EXAMPLE 3

1 equivalent of potassium hydride is reacted with a slight excess over 2 equivalents of diphenylmagnesium in a diethyl ether medium at a temperature of 30° C until a complex forms in the form of an insoluble solid which, on analysis, is shown to correspond to the formula $KH\cdot 2Mg\ \phi_2$. The excess diphenylmagnesium remains in solution. In this particular case, it appears that the complex forms and precipitates out before cleavage occurs by the diethyl ether.

EXAMPLE 4

1 equivalent of potassium hydride is reacted with 1 equivalent of dicyclohexylmagnesium in a cyclohexane medium at a temperature of 40° C until the complex is formed.

EXAMPLE 5

1 equivalent of cesium hydride is reacted with 1 equivalent of di-s-butylmagnesium in a toluene medium at 30° C until the complex is formed.

In polymerization reactions carried out in accordance with the present invention, the polymers which can be produced are homopolymers as well as copolymers. The monomers, which most desirably contain from 4 to 12 carbon atoms, that can be employed are conjugated dienes and vinyl-substituted aromatic compounds which, conveniently, are generically referred to herein as monomers. They include, by way of illustration, butadienes such as 1,3-butadiene; isoprene; piperylene; styrene; α-methylstyrene; 1,4-divinyl-benzene; 1-vinylnaphthalene and 2-vinylnaphthalene. Numerous others are well known to the prior art and are shown, for instance, in U.S. Pat. Nos. 3,091,606 and 3,377,404, the disclosures of which, in relation to conjugated dienes and vinyl-substituted aromatic compounds, are hereby incorporated by reference. Monoolefins can also be effectively polymerized with the catalyst systems of the present invention. Such monoolefin monomers include, for instance, ethylene, propylene, 1-butene, 2-butene, isobutene and higher molecular weight monoolefins.

The following examples are illustrative of the preparation of polymers in accordance with the present invention.

EXAMPLE

PREPARATION OF 1,3-BUTADIENE POLYMER USING, AS A CATALYST, A 1:1 COMPLEX OF DI-SEC-BUTYLMAGNESIUM AND POTASSIUM HYDRIDE

To 1 l of hexane was added 0.0504 moles of potassium di-sec-butylmagnesium hydride and 0.04 moles of N,N,N',N-tetramethylethylenediamine. 1,3-butadiene was initially fed as a gas at 3.4 l/min; however, after approximately 5 minutes, the feed rate was reduced to 1.7 l/min due to heavy reflux. The temperature rose immediately from room temperature to 60°, but was maintained afterwards at 40° with external cooling. After 40 minutes, the reaction was terminated with water. Removal of hexane under reduced pressure yielded 235 g of an extremely viscous polymer whose molecular weight was 2100. The microstructure of the polymer was cis = 0, trans 33.58%, vinyl 66.42%.

What is claimed is:

1. In a method of preparing polymers in which the polymers are prepared by polymerizing at least one conjugated diene monomer, the improvement which consists in the utilization, as the catalyst, of a complex of a tetraalkylammonium hydride or of an alkali metal hydride in which the alkali metal is selected from the group of sodium, potassium, lithium and cesium, with an organomagnesium selected from the group of $C_2$–$C_{15}$ dialkylmagnesiums, dicycloalkylmagnesiums and carbocyclic diarylmagnesiums.

2. The method of claim 1, in which said complex corresponds to the formula $M_nMgR^1R^2H_n$ where M is an alkali metal selected from the group of sodium, potassium, lithium and cesium, $R^1$ and $R^2$ are the same or different $C_4$–$C_{15}$ alkyl, cycloalkyl, carbocyclic aryl and carbocyclic aralkyl, and n is 1, 2 and 3.

3. The method of claim 2, in which M is potassium, $R^1$ and $R^2$ are each $C_4$–$C_5$ alkyl, and n is 1 or 2.

4. The method of claim 3, in which $R^1$ and $R^2$ are each s-butyl.

5. The method of claim 4, in which the complex corresponds to the formula $KMg(s\text{-}Bu)_2H$.

6. The method of claim 1, in which the complex corresponds to the formula $NaMg(s\text{-}Bu)_2H\cdot s\text{-}Bu_2Mg$.

7. The method of claim 1, in which said catalyst is a complex corresponding to the formula $M_nMgR^1R^2H_n$ where M is tetraalkylammonium, $R^1$ and $R^2$ are the same or different $C_4$–$C_5$ alkyl, and n is 1, 2 or 3.

8. The method of claim 1, in which the monomer is 1,3-butadiene.

9. The method of claim 1, in which 1,3-butadiene is copolymerized with styrene.

10. The method of claim 4, in which the monomer is 1,3-butadiene.

11. The method of claim 4, in which 1,3-butadiene is copolymerized with styrene.

* * * * *